UNITED STATES PATENT OFFICE.

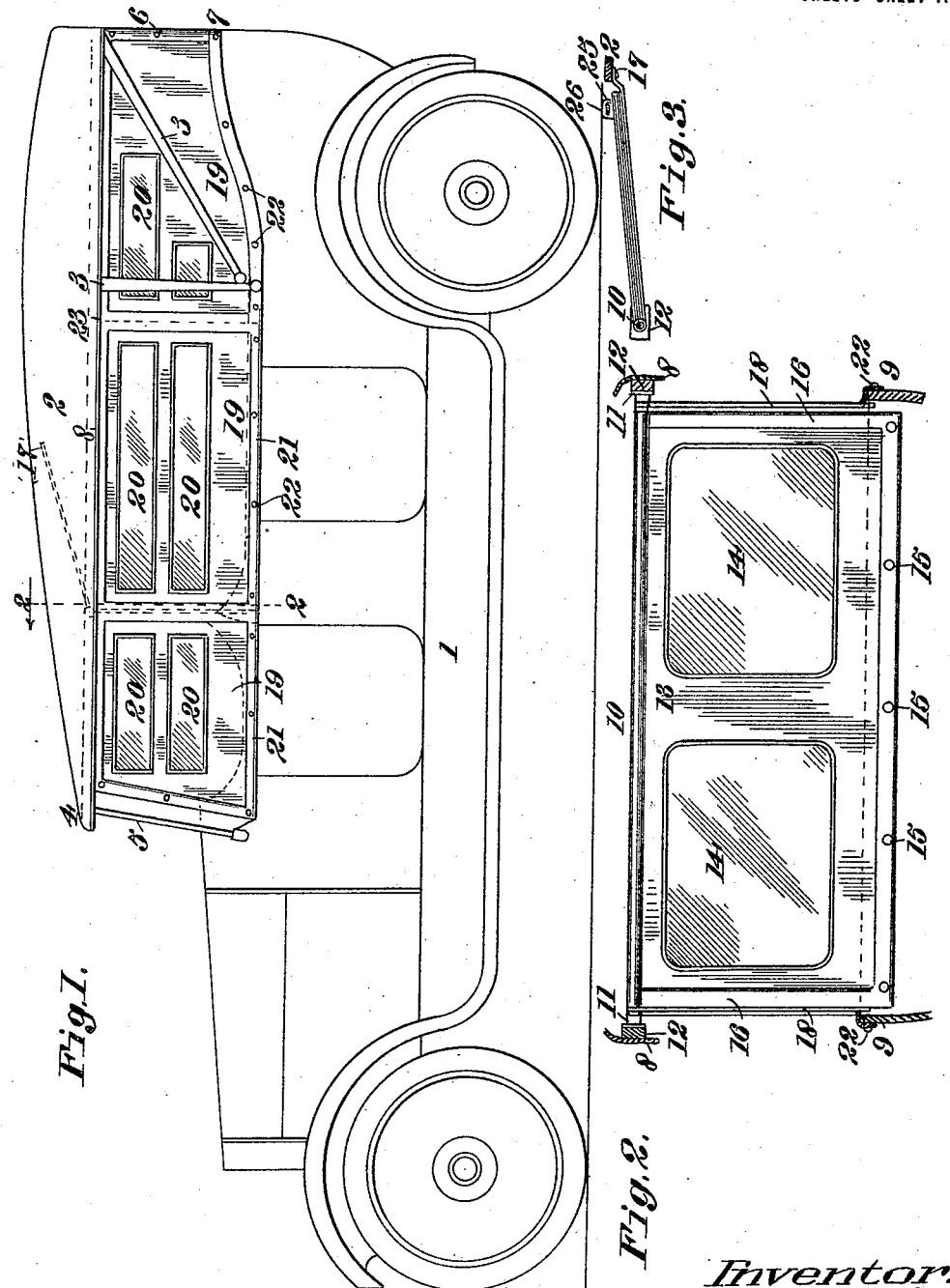

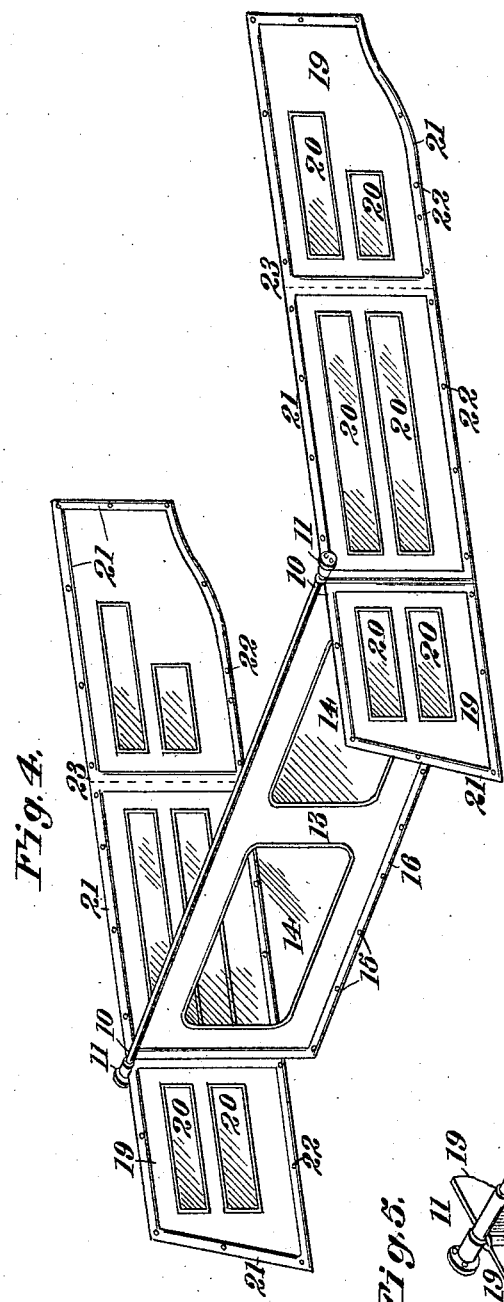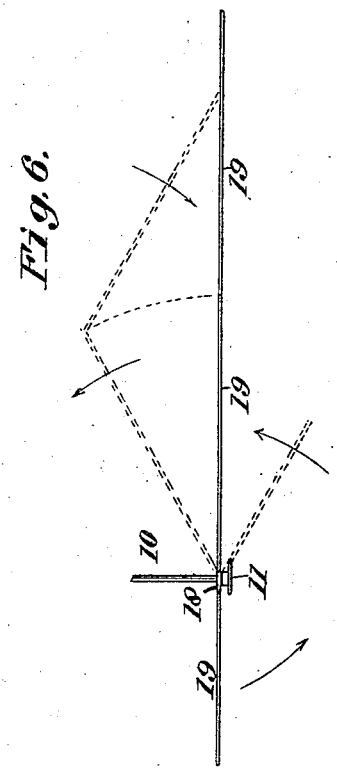

ALLEN W. WIDENHAM, OF OAKLAND, CALIFORNIA.

VEHICLE CURTAIN CONSTRUCTION AND MOUNTING.

1,414,681.   Specification of Letters Patent.   Patented May 2, 1922.

Application filed March 7, 1921. Serial No. 450,226.

*To all whom it may concern:*

Be it known that I, ALLEN W. WIDENHAM, a citizen of the United States, residing at Oakland, in the county of Alameda and State of California, have invented certain new and useful Improvements in Vehicle Curtain Construction and Mounting, of which the following is a specification.

The present invention relates to improvements in the mounting and construction of side curtains employed in connection with vehicles particularly motor driven vehicles.

The invention has for one of its objects to provide a supporting rod construction disposed transversely beneath the vehicle top adjacent its forward end, and which provides the sole permanent attaching means for securing the curtains associated with opposite sides of the vehicle to the top.

A further object is to provide a construction wherein the curtain supporting means also support a vehicle dividing curtain adapted to be dropped to provide a division between the driver's compartment and tonneau.

Further objects are to provide a construction wherein the curtain sections are capable of independently folding and of being swung to closed position without interfering with the division curtain, and to provide a construction which is adapted for attaching to vehicle tops as now universally in use.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in side elevation of a vehicle with my improved curtain construction illustrated in connection therewith, the curtains being in a position to enclose the vehicle occupants.

Figure 2 is a sectional view taken on line 2—2 of Figure 1.

Figure 3 is a view in detail of the curtain construction folded and swung to a position beneath the vehicle top when the curtains are not in use.

Figure 4 is a perspective view of my improved construction removed from the vehicle top.

Figure 5 is a detail perspective view of one end of the supporting rod illustrated in Figure 4 with the curtain construction and dividing curtain construction associated therewith.

Figure 6 is a view in detail plan illustrating one manner of folding the curtain sections.

In the drawings, wherein like characters of reference designate corresponding parts, 1 indicates a vehicle and 2 the collapsible top thereof of any suitable construction and preferably of that type supported by bows 3 at its rear and resting at its forward end 4 on the wind shield 5. The top is provided with the usual rear curtain 6 attached at its lower edge to the upper edge of the body as at 7.

To enclose the space between the opposite side edges 8 of the vehicle top and the upper edge 9 of the body at opposite sides of the vehicle, I provide a side curtain construction which consists of the main supporting rod 10 disposed transversely beneath the vehicle top, as in Figure 2, and secured at its opposite ends in any suitable manner as by members 11 to the longitudinal members 12 at opposite sides of the top 2. The rod 10 is preferably disposed immediately above the back of the vehicle driver's seat and the same mounts a compartment dividing curtain 13 preferably formed with transparent portions 14 and carrying on its lower edge detachable fastening means 15 for detachably securing to suitable fasteners, not shown, on the back of the vehicle driver's seat. The curtain 13 is preferably carried in a frame 16 mounted for swinging movement axially of the rod 10 which permits of the curtain being swung upwardly from its vertical position to a substantially horizontal position, indicated in dotted lines, Figure 1, and secured at its free end to a point 17 beneath the vehicle top 2. At opposite ends of the rod 10 exteriorly of the opposite end of the curtain 13 and its supporting frame 16 are mounted the side curtain supporting rods 18 capable of axial pivotal movement about said rod 10, and said rods 18 extend transversely through suitable side curtain constructions consisting of foldable sections 19 provided with transparent portions 20, and each section preferably carried within the frame 21. The sections forming the curtains at opposite sides of the vehicle are adapted preferably to fold on a vertical line adjacent the rear edge of the back of the vehicle driver's seat, and at a point slightly in advance of the tonneau seat providing three sections for each curtain, one enclosing the operator's compartment, another enclosing the tonneau in advance of the tonneau seat, and the other enclosing that portion of the tonneau adjacent the tonneau seat. The sections are provided at suitable points with fastening devices 22 for detachably securing the sections to the vehicle body when the curtains are in a position to enclose the respective compartments.

From Figure 6, it will be observed that when folding the curtains, the hinge or fold joint connection 23 is swung inwardly with the rear curtain section overlying that section immediately preceding the same, the two folded sections lying in superimposed relation against the rear face of the dividing curtain 13. These compartments of the section enclosing the vehicle driver's compartment may be swung outwardly to either lie between the folded sections or overlie the rear folded section, at which time the dividing curtain 13 is raised as in Figure 3, and its lower edge is secured to a support, as at 17, retaining the curtains in their folded position when not in use. If desirable, the curtain sections protecting the driver's compartment may have the dividing curtain 13 first raised by swinging inwardly and rearwardly, and after the dividing curtain is lowered may be detachably secured thereto, enabling the vehicle to be operated with the driver's compartment open and the tonneau closed, also, if desirable, the dividing curtain 13 may be raised or lowered when the side curtains are in position to enclose the driver's compartment and tonneau, and if desirable the side curtains may be folded, as in Figure 6, and swung upwardly, as in Figure 3; at which time the detachable securing means 25 carried by the curtain is secured to a member 26 associated with the top permitting the retaining of the curtain in elevated position and enabling the dropping of the dividing curtain 13.

Having thus described my invention what I claim as new and desire to secure by Letters Patent of the United States is:—

1. In combination with a vehicle and its associated top, of side curtains for positioning to close the spaces at opposite sides of the vehicle between the vehicle side wall edge and top edge, said curtains at opposite sides of the vehicle consisting of united sections foldable one upon the other, a supporting rod extending transversely of the vehicle top and secured at its ends thereto approximately midway of the length of said top, a curtain mounting rod fulcrumed to each end of said supporting rod to swing about the same, said mounting rods extending transversely across said curtains and providing a support for the edge thereof when said curtains are folded and said rods are swung upwardly about said supporting rod.

2. In combination with a vehicle and its associated top, of side curtains for positioning to close the spaces at opposite sides of the vehicle between the vehicle side wall edge and top edge, said curtains at opposite sides of the vehicle consisting of united sections foldable one upon the other, a supporting rod, secured at opposite ends to opposite sides of the vehicle top, a supporting connection between said rod and each of said curtains whereby said curtains are capable of independent folding in overlapping relation longitudinally of said rod, a dividing curtain carried by the rod and capable of swinging movement thereon and means for securing the free end of said dividing curtain beneath said top for supporting said side curtains when in folded position.

3. In combination with a vehicle and its associated top of side curtains for positioning to close the spaces at opposite sides of the vehicle between the vehicle side wall edge and top edge, said curtains at opposite sides of the vehicle consisting of united sections foldable one upon the other, a curtain mounting rod extending transversely across each of said curtains, a supporting connection between the upper end of each of said rods and said vehicle top, said connection permitting the swinging of said rods upwardly to a substantially horizontal position on the folding of said curtain sections inwardly in overlapping relation.

In testimony whereof I have signed my name to this specification.

ALLEN W. WIDENHAM.